(12) United States Patent
Kohda (10) Patent No.: US 6,507,037 B2
(45) Date of Patent: Jan. 14, 2003

(54) STIMULABLE PHOSPHOR SHEET AND PROCESS FOR PRODUCING THE SAME

(75) Inventor: Katsuhiro Kohda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 23 days.

(21) Appl. No.: 09/866,473

(22) Filed: May 29, 2001

(65) Prior Publication Data

US 2002/0017622 A1 Feb. 14, 2002

(30) Foreign Application Priority Data

May 29, 2000 (JP) ........................................ 2000-158213

(51) Int. Cl.$^7$ .............................................. G01T 1/105
(52) U.S. Cl. ........................ 250/581; 250/582; 250/584
(58) Field of Search ................................. 250/581, 584, 250/585, 586, 587, 588, 589

(56) References Cited

U.S. PATENT DOCUMENTS 4,769,549 A * 9/1988 Tsuchino et al. ........ 250/484.1
4,947,046 A * 8/1990 Kawabata et al. ....... 250/484.1

* cited by examiner

*Primary Examiner*—Constantine Hannaher
*Assistant Examiner*—Timothy Moran
(74) *Attorney, Agent, or Firm*—Sughrue Mion, PLLC (57) ABSTRACT

A stimulable phosphor film in which acicular particles of stimulable phosphor having an aspect ratio of 1.5 or more are oriented in the direction of depth of the phosphor film gives a reproduced radiation image having increased sharpness when it is employed in a radiation image recording and reproducing method.

17 Claims, 7 Drawing Sheets

# STIMULABLE PHOSPHOR SHEET AND PROCESS FOR PRODUCING THE SAME

FIELD OF THE INVENTION

The present invention relates to a stimulable phosphor sheet employable in a radiation image recording and reproducing method utilizing stimulated emission from a stimulable phosphor.

BACKGROUND OF THE INVENTION

As a method replacing a conventional radiography using a combination of a radiographic film and radiographic intensifying screens, a radiation image recording and reproducing method utilizing a stimulable phosphor was proposed and has been practically employed. This method employs a radiation image storage panel comprising a stimulable phosphor layer (i.e., stimulable phosphor sheet) provided on a support, and the procedure of the method comprises the steps of causing the stimulable phosphor in the phosphor sheet to absorb radiation energy having passed through an object or having radiated from an object; sequentially exciting the stimulable phosphor with stimulating rays to release the radiation energy stored in the phosphor sheet as light emission (i.e., stimulated emission); photoelectrically detecting the emitted light to obtain electric signals; and reproducing the radiation image of the object as a visible image from the electric signals. The stimulable phosphore sheet thus processed is subjected to a step for erasing a radiation image remaining therein, and then stored for the next recording and reproducing procedure. Thus, the radiation image storage panel can be repeatedly employed.

Generally, a substrate film and a protective cover film are provided on the top and bottom surfaces of the stimulable phosphor sheet, respectively. The stimulable phosphor sheet generally comprises a binder and stimulable phosphor particles dispersed therein, but it may consist of agglomerated phosphor with no binder. The phosphor sheet containing no binder can be formed by deposition process or sintering process. Further, the sheet comprising agglomerated phosphor soaked with a polymer is also known. In the aforementioned method, any types of the stimulable phosphor sheets are employable.

The radiation image recorded in the stimulable phosphor sheet is generally read by the steps of applying stimulating rays onto the front surface side (phosphor layer side) of the phosphor sheet, collecting light emitted by the phosphor particles by means of a light-collecting means from the same side, and photoelectrically converting the light into image signals. A system for reading the image from one side of the panel in this manner is referred to as "single-side reading system". However, there is a case that the light emitted by the phosphor particles should be collected from both sides (i.e., front and the back surface sides) of the phosphor sheet. For instance, there is a case that the emitted light is desired to be collected as much as possible. There also is a case that the radiation image recorded in the phosphor layer varies along the depth of the layer, and it is desired to detect the variation. A system for reading the image from both sides of the phosphor sheet is referred to as double-side reading system".

The radiation image recording and reproducing method is often used in radiography for medical diagnosis. In that case, it is especially desired to reproduce a radiation image of high quality (particularly, high sharpness for high resolution) by applying a small dose of radiation. Thus, the stimulable phosphor sheet is required to have a high sensitivity and to provide an image of high quality.

The sharpness of radiation image is mainly affected by diffusion or scattering of the stimulating rays in the stimulable phosphor sheet. If the stimulating rays diffuse or scatter (horizontally in particular) in the phosphor sheet, it excites the phosphor not only at the target spot but also in its periphery. Consequently, the stimulated emission emitted from the target position is collected together with that from the periphery. Such noise of the emissions impairs the sharpness of the resulting radiation image.

For avoiding the diffusion or scattering of the stimulating rays, it has been proposed to divide the plane of the stimulable phosphor sheet into small sections with partitions reflecting the stimulating ray.

Japanese Patent Provisional Publication No. 59-202100 discloses a stimulable phosphor sheet of a honey-comb structure consisting of many small cells filled with a stimulable phosphor. The phosphor sheet is composed of a substrate and a stimulable phosphor layer, and the honey-comb structure sectioned with a partition is further provided on the phosphor layer.

Japanese Patent Provisional Publication No. 62-36599 discloses a stimulable phosphor sheet employing a support provided with many hollows regularly arranged on one surface The hollows are filled with stimulable phosphor, and the ratio of depth to diameter of each hollow is 3.5 or more.

Japanese Patent Provisional Publication No. 5-512636 discloses a process for preparing pixel phosphors with a mold.

Japanese Patent Provisional Publication No. 2-129600 discloses a storage panel employing a support plate having many holes vertically bored and filled with a stimulable phosphor.

Japanese Patent Provisional Publication No. 2-280100 discloses a stimulable phosphor sheet employing a substrate having a honey-comb micro-structure filled with a stimulable phosphor.

In each of the aforementioned known stimulable phosphor sheets employing a support or substrate provided with many holes or hollows incorporated with a stimulable phosphor, a part of the support or substrate serves as a partition preventing the simulating rays from diffusion. The stimulable phosphor sheet of this type, therefore, is useful for improving quality (particularly, sharpness) of the resulting radiation image. On the other hand, since the partition of support material partly occupies the phosphor layer, the amount of the phosphor incorporated in a unit volume of the layer is often too small to absorb enough amount of radiation. Consequently, the partition lowers the sensitivity of the stimulable phosphor sheet. Although the sensitivity can be enhanced by thickening the phosphor layer, a thick phosphor layer generally impairs the sharpness.

In U.S. Pat. No. 6,255,660, a stimulable phosphor sheet which comprising a stimulable phosphor-containing partition which divides the stimulable phosphor sheet along its plane into small sections, and a stimulable phosphor-incorporated area which is divided with the partition and which has a reflectivity with respect to the stimulating rays differing from a reflectivity with respect to the stimulating rays of the stimulable phosphor-containing partition is described.

Japanese Patent Provisional Publication No. 2-58000 describes a stimulable phosphor sheet having narrow columnar stimulable phosphor crystals which are independently and slantingly deposited on a support by a gaseous deposition method.

In radiography for medical diagnosis, the use of a stimulable phosphor sheet of high sensitivity can reduce a dose of radiation to be applied to a patient. Therefore, it is required to provide a stimulable phosphor sheet giving an image of high sharpness with high sensitivity.

Accordingly, it is an object of the invention to provide a stimulable phosphor sheet in which the diffusion or scattering of the stimulating rays is effectively avoided so as to give a radiation image having high sharpness without deterioration of graininess.

It is another object of the invention to provide industrially advantageous processes for preparing the stimulable phosphor sheet of the invention.

SUMMARY OF THE INVENTION

The present invention resides in a stimulable phosphor sheet comprising a stimulable phosphor film in which acicular particles of stimulable phosphor having an aspect ratio (in terms of a mean aspect ratio) of 1.5 or more, preferably 2.0 to 10.0, are oriented in the direction of depth of the phosphor film.

The stimulable phosphor film of the stimulable phosphor sheet of the invention preferably has a structure in which the acicular phosphor particles are enclosed with partitions containing light-reflecting material and stimulable phosphor particles.

The invention also resides in a radiation image recording and reproducing method comprising the steps of recording a radiation image as a latent image on a stimulable phosphor sheet of the invention, irradiating the phosphor sheet with stimulating rays to release stimulated collected emission from the latent image, collecting the stimulated emission, and electrically processing the collected emission to reproduce the radiation image.

The invention further resides in a process for preparing a stimulable phosphor film in which acicular particles of stimulable phosphor having an aspect ratio of 1.5 or more are oriented in the direction of depth of the film, comprising the steps of:

continuously causing a dispersion comprising the acicular particles of stimulable phosphor and a liquid medium to flow in one direction to produce a continuous film comprising a liquid medium in which the acicular phosphor particles are aligned in the direction;

drying the film of liquid film to produce a dry continuous film in which the acicular phosphor particles are aligned in the direction;

sectioning the dry continuous film to give a multiple of phosphor films;

laminating the phosphor films one on another under the condition that all phosphor films have the same alignment of the acicular phosphor particles to produce a phosphor film block in which the acicular phosphor particles are aligned in the same direction; and slicing the phosphor film block in the direction perpendicular to the direction of alignment of the acicular phosphor particles.

The invention furthermore resides in a process for preparing a stimulable phosphor film having a structure in which the acicular particles of stimulable phosphor having an aspect ratio of 1.5 or more are oriented in the direction of depth of the film and enclosed with partitions containing light-reflecting material and stimulable phosphor particles, comprising the steps of:

continuously causing a dispersion comprising the acicular particles of stimulable phosphor and a liquid medium to flow in one direction to produce a continuous film comprising a liquid medium in which the acicular phosphor particles are aligned in the direction;

drying the film of liquid film to produce a dry continuous film in which the acicular phosphor particles are aligned in the direction;

sectioning the dry continuous film to give a multiple of phosphor films;

preparing partition films containing light-reflecting material and stimulable phosphor particles;

laminating the phosphor films and the partition films one on another under the condition that all phosphor films have the same alignment of the acicular phosphor particles to produce a block in which the phosphor films and the partition films are alternatively laminated; and slicing the block in the direction perpendicular to the direction of alignment of the acicular phosphor particles.

BRIEF DESCRIPTION OF DRAWINGS

FIG. 1-(1) schematically illustrates a typical structure of a stimulable phosphor sheet of the invention, and FIG. 1-(2) is an enlarged view of the stimulable phosphor layer of FIG. 1-(1).

DETAILED DESCRIPTION OF THE INVENTION

A stimulable phosphor sheet of the invention is explained, by referring to the figures illustrated in the attached drawings.

FIG. 1-(1) illustrates a schematic section view of a stimulable phosphor sheet 10 which comprises, in order, a support film 11, an adhesive layer 12, a stimulable phosphor layer (or film) 13, and a protective film 14. In the stimulable phosphor layer 13, acicular stimulable phosphor particles 15 are dispersed in a binder 16 under the condition that the acicular particles 15 are oriented in the direction of depth of the phosphor layer 13, as is understood from the enlarged view of FIG. 1-(2).

The acicular stimulable phosphor particles employed in the stimulable phosphor sheet of the invention have an aspect ratio of 1.5 or more, preferably 2.0 to 10.0. The acicular particles preferably have a median of particle size in the range of 1 to 20 μm.

The definition of "acicular particles oriented in the direction of depth of the phosphor layer (or film)" means that 90 wt. % or more of the phosphor particles in the phosphor layer or film are oriented in directions essentially perpendicular (within 90°±5°) to the plane of the stimulable phosphor sheet.

As the stimulable phosphor, a phosphor giving a stimulated emission of a wavelength in the region of 300 to 500 nm when it is irradiated with stimulating rays of a wavelength in the region of 400 to 900 nm is preferably employed. In Japanese Patent Provisional Publications No. 2-193100 and No. 4-310900, some examples of the stimulable phosphors are described in detail. Examples of the preferred stimulable phosphors include divalent europium or cerium activated alkaline earth metal halide phosphors (e.g., BaFBr:Eu, BaF(BrI):Eu), and cerium activated oxyhalide phosphors.

Most preferred stimulable phosphors are rare earth metal activated alkaline earth metal fluorohalide phosphors having the following essential formula (I):

$$M^{II}FX:zLn \qquad (I)$$

in which $M^{II}$ is an alkaline earth metal such as Ba, Sr, or Ca; Ln is a rare earth metal such as Ce, Pr, Sm, Eu, Tb, Dy, Ho, Nd, Er, Tm, or Yb; X is a halogen atom such as Cl, Br, or I; and z is a value satisfying the condition of $0<z\leq 0.2$.

$M^{II}$ of the formula (I) preferably comprises Ba in an amount of 50 atomic % or more. Ln preferably is Eu or Ce. It should be noted that the formula (I) does not mean F:X=1:1, but means to have a crystalline structure of BaFX. Thus, the formula (I) does not accurately indicate stoichiometric amounts of the constitutional elements. It is generally preferred that F is slightly rich in comparison with X, because $F^+$ center ($X^-$ center) produced in such composition efficiently gives a stimulated emission when the phosphor is stimulated with a light in the region of 600 to 700 nm.

The stimulable phosphor of the formula (I) can further contain one or more of the following additive components:

In the above formulas, A is a metal oxide such as $Al_2O_3$, $SiO_2$ or $ZrO_2$, in which source of the metal oxide preferably is extremely fine particles having a mean diameter (of primary particles) of 0.1 μm or less and has little reactivity to $M^{II}FX$ particles to keep the $M^{II}FX$ particles from coagulation; $N^I$ is a compound of an alkali metal such as Li, Na, K, Rb, or Cs; $N^{II}$ is a compound of an alkaline earth metal such as Mg and/or Be; and $N^{III}$ is a compound of a monovalent or trivalent metal such as Al, Ga, In, Tl, Sc, Y, La, Gd, or Lu. The metal compounds preferably are halide compounds such as those described in Japanese Patent Provisional Publication No. 59-75200.

In the formulas, each of b, w, x, and y is a value which means an amount of each source material, based on one molar amount of $M^{II}FX$, under the conditions of $0\leq b\leq 0.5$, $0\leq w\leq 2$, $0\leq x\leq 0.3$, and $0\leq b\leq 3$. Accordingly, the value of b, w, x, or y does not necessarily mean the amount of each element or compound existing in the finally produced phosphor. Further, each additive compound may exist as such in the finally produced phosphor or may react with $M^{II}FX$ in the course of the preparation of the stimulable phosphor.

Furthermore, the stimulable phosphor of the formula (I) may contain one or more of the following compounds or reaction products thereof:

Compounds of Zn and Cd described in Japanese Patent Provisional Publication No. 55-12145;

Metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$, and $ThO_2$ described in Japanese Patent Provisional Publication No. 55-160078;

Compounds of Zr and Sc described in Japanese Patent Provisional Publication No. 56-116777;

Compounds of B described in Japanese Patent Provisional Publication No. 57-23673;

Compounds of As and Si described in Japanese Patent Provisional Publication No. 57-23675;

Tetrafluoroborate compounds described in Japanese Patent Provisional Publication No. 59-27980;

Hexafluoro compounds such as monovalent or divalent salts of hexafluorosilicic acid, hexafluorotitanic arid, or hexafluorozirconic acid described in Japanese Patent Provisional Publication No. 59-47289; and Compounds of transitional metals such as V, Cr, Mn, Fe, Co, and Ni described in Japanese Patent Provisional Publication No. 59-56480.

Moreover, other additives may be incorporated, provided that the incorporated additives do not disturb the preparation of the essential phosphor composition of the formula (I).

The acicular stimulable phosphor particles having a high aspect ratio are already known for rare earth element-activated alkaline earth metal fluorohalide phosphors, and described, for instance, in U.S. Pat. No. 5,534,191. The particle size preferably is in the range of 1 μm to 20 μm, more preferably 2 μm to 7 μm, in terms of Median diameter (Dm), and σ/Dm (σ is a standard deviation of the particle size distribution) preferably is not more than 50%, more preferably not more than 40%. The particles may be in the form of parallelepiped, regular hexahedron, regular octahedron, tetradecahedron, intermediate polyhedron, or amorphous. The phosphor particles of tetradecahedron are preferred.

The stimulable phosphor layer or film not necessarily contains a binder. Accordingly, the stimulable phosphor layer of film consists essentially of acicular phosphor particles oriented in the direction of the depth of the phosphor film or layer. The stimulable phosphor layer or film generally has a thickness in the range of 50 to 1,500 μm.

Moreover, if the stimulable phosphor layer is self-supporting, the support film and protective film may be omitted.

Some processes for preparing a stimulable phosphor film are schematically illustrated in FIGS. 2 to 5.

In the first step of the preparing processes, a dispersion of acicular stimulable phosphor particles in a liquid carrier medium is prepared. Examples of the liquid carrier media include inorganic carrier media (e.g., water or aqueous medium), organic liquids, and solutions of polymer materials. Solid materials which melt at elevated temperatures to become liquid are also employable.

Examples of the organic solvents include lower alcohols such as methanol, ethanol, n-propanol, and n-butanol; chlorinated hydrocarbons such as methylene chloride and ethylene chloride; ketones such as acetone, methyl ethyl ketone, and methyl isobutyl ketone; lower aliphatic alcohol esters of lower alcohols such as methyl acetate, ethyl acetate, and butyl acetate; ethers such as dioxane, ethylene glycol monoethyl ether, ethylene glycol monomethyl ether, and tetrahydrofuran; and mixtures of these solvents.

An organic polymer material is preferably dissolved in an organic solvent to give a viscous solution which serves as a liquid carrier medium for the acicular phosphor particles. The organic polymer material may serve as binder in the produced stimulable phosphor film.

Examples of the organic polymer materials include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers.

The stimulable phosphor particles are placed in an appropriate liquid carrier medium to prepare a phosphor dispersion. Generally, the ratio of polymer material and stimulable phosphor particles in the phosphor dispersion generally is in the range of 1:1 to 1:100 (by weight), preferably 1:8 to 1:40.

The phosphor dispersion is run or spread in one direction, optionally, on a continuous belt.

Figure 2:
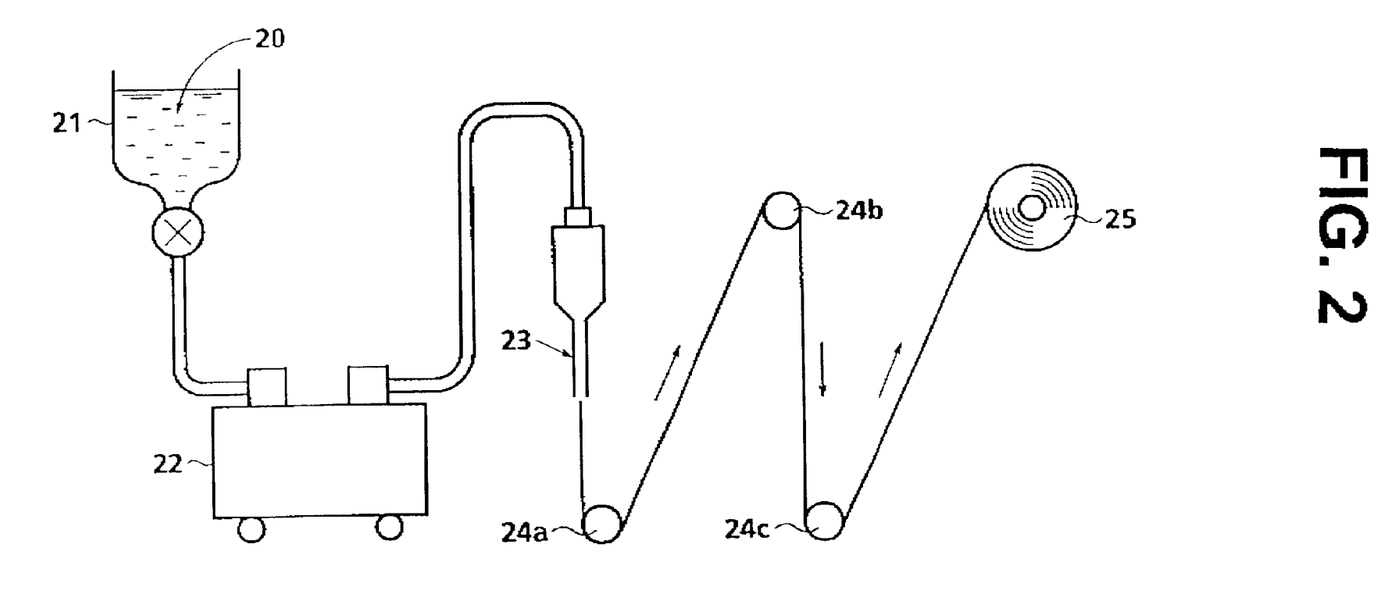
FIG. 2 shows a procedure for preparing a continuous stimulable phosphor film in which the acicular stimulable phosphor particles are aligned in the longitudinal direction.

In FIG. 2, the phosphor dispersion 20 placed in a stock tank 21 is supplied into a plunger pump 22 and then extruded though a nozzle 23 at a certain pressure. The nozzle 23 generally has a diameter of 0.1 to 10 mm. The pressure for extrusion generally is in the range of 2 to 100 kg/cm$^2$. The nozzle may have a circular or square section. The extruded dispersion 20 is dried to become more viscous dispersion which is then run over the rollers 24a, 24b, 24c to turn into a continuous film. Thus produced continuous film comprising acicular phosphor particles and binder are wound over a winding roll 25. In the course of extrusion and running over the rollers, the acicular phosphor particles are aligned in the running direction by sharing force, and therefore the acicular phosphor particles are aligned in the produced continuous film under the condition that the longer axes are placed essentially parallel with the longitudinal direction of the film.

Figure 3:
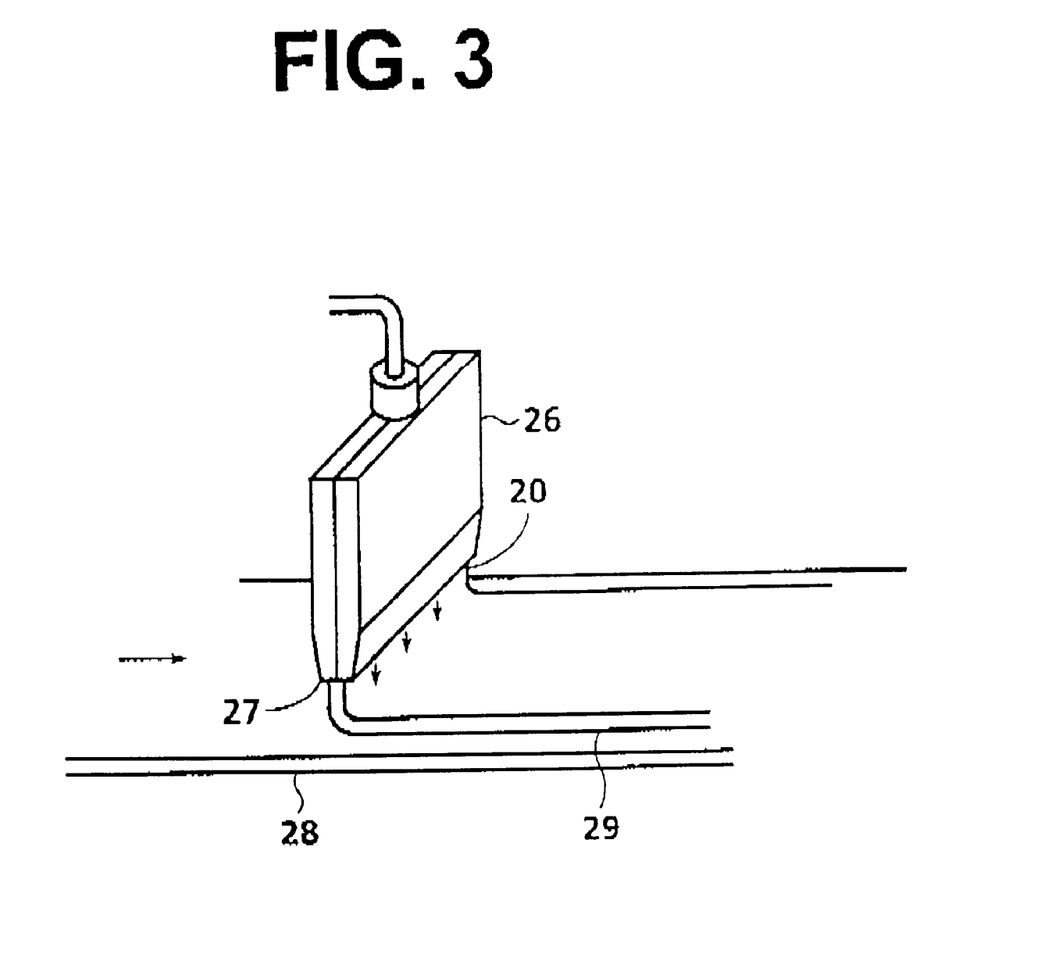
FIG. 3 shows another procedure for preparing a continuous stimulable phosphor film in which the acicular stimulable phosphor particles are aligned in the longitudinal direction.

Alternatively, the acicular phosphor particle dispersion can be extruded from a linear slit, as is shown in FIG. 3. In FIG. 3, the dispersion 20 which was supplied by a pump (not shown) to a vessel 26 is extruded through a slit 27 at a constant pressure and placed on a belt 28 moving in the direction of arrow to form a spread film 29. The spread film 29 is dried within a short period of time to give a continuous film in which the acicular stimulable phosphor particles are aligned under the condition that the longer axes of the particles are placed essentially parallel with the longitudinal direction of the film. If the phosphor dispersion consists essentially of phosphor particles and a solvent, the film consists of aligned phosphor particles only.

Figure 4:
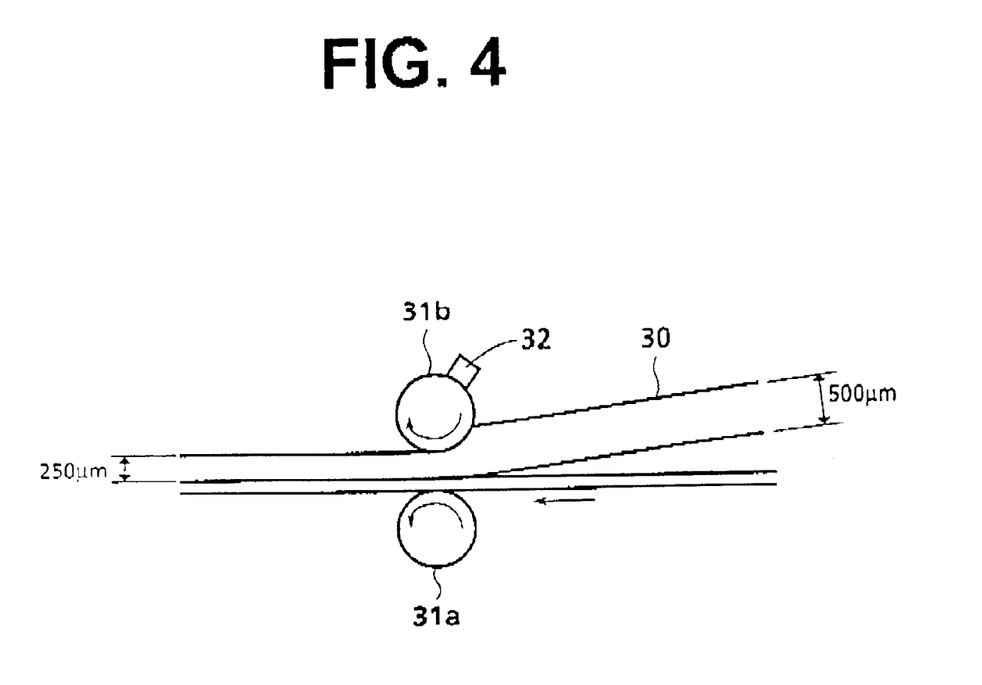
FIG. 4 shows a pressing procedure for imparting more complete orientation to a continuous stimulable phosphor film in which the acicular stimulable phosphor particles are aligned in the longitudinal direction.

The alignment of the acicular phosphor particles in a continuous film can be accomplished by rolling a wet or dry continuous film under pressure, as is shown in FIG. 4

In FIG. 4, an acicular phosphor particle-containing film 30 is moved in the direction of arrow and passed through a pair of rollers 31a, 31b. The lower roller (driving roller) 31A is rotated at a constant rate, while the upper roller (counter roller) 31b is rotated at a lower rate under pressure of a brake 32. Generally, the driving roller 31a is rotated at a linear rate of 0.1 to 10 m/sec., while the counter roller 31b is rotated at a rate of 30 to 95% of that of the driving roller. The rollers may be heated, and the films are kept at an extension force of 0.1 to 10 kg/cm. As is illustrated in FIG. 4, the continuous acicular phosphor particle-containing film 30 is preferably rolled on a continuous belt having a releasing layer on its surface.

Figure 5:
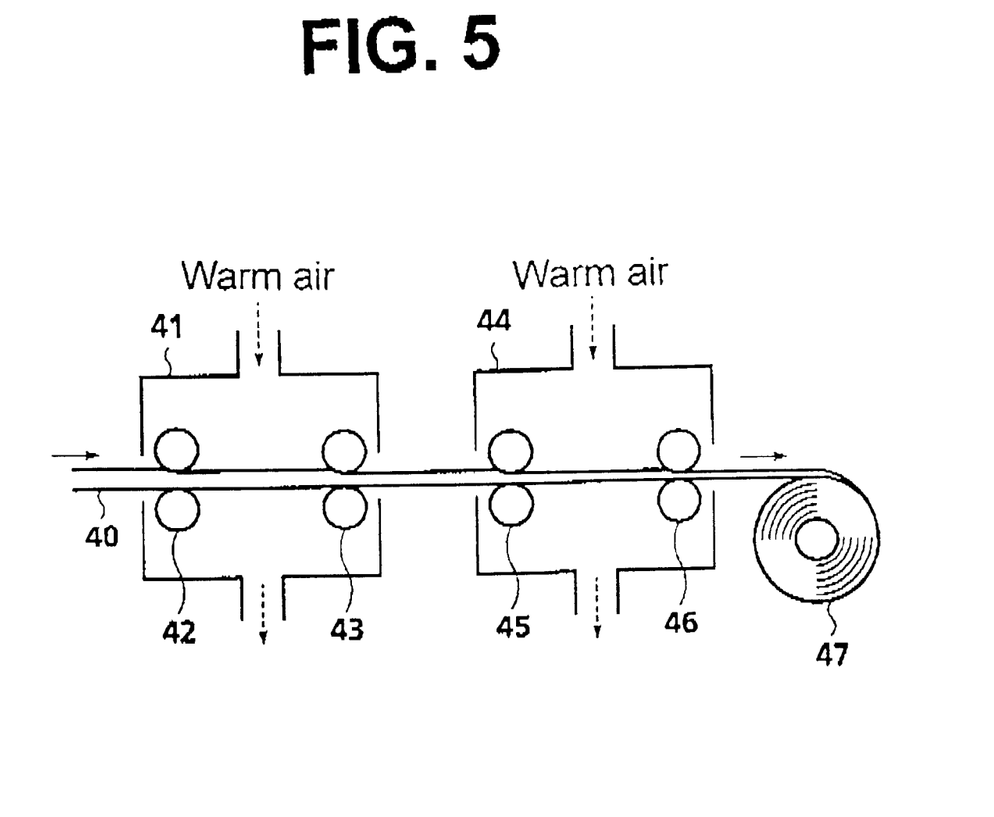
FIG. 5 shows a stretching procedure for imparting more complete alignment to a continuous stimulable phosphor film in which the acicular stimulable phosphor particles are aligned in the longitudinal direction.

The alignment of acicular phosphor particles in a longitudinal film can be also performed by extending the continuous film in the direction of length of the film to give a dry continuous film having a reduced thickness, in the manner illustrated in FIG. 5.

In FIG. 5, a continuous acicular phosphor particle-containing film 40 is moved in the direction of arrow to enter a first zone 41 which is kept at a constant temperature. In the first zone 41, the continuous film 40 is passed between a couple of pass rollers 42, 43. A pair of rollers 43 rotate at a rate higher than that of a pair of rollers 42. Therefore, the continuous film 40 is extended between the pass rollers 42 and the pass rollers 43. The continuous film 40 is then moved into a second zone 44 in which the film 40 is passed between a couple of pass rollers 45, 46. A pair of rollers 46 rotate at a rate higher than that of a pair of rollers 45. Therefore, the continuous film 40 is further extended between the pass rollers 45 and the pass rollers 46. Subsequently, the twice extended continuous film 40 is wound around a winding roll 47. The first zone and second zone are generally kept at a temperature of 40 to 200° C. by supplying warm air into the zone. In each zone, the continuous film is subjected to tension of 0.1 to 50 kg/cm.

Figure 6:
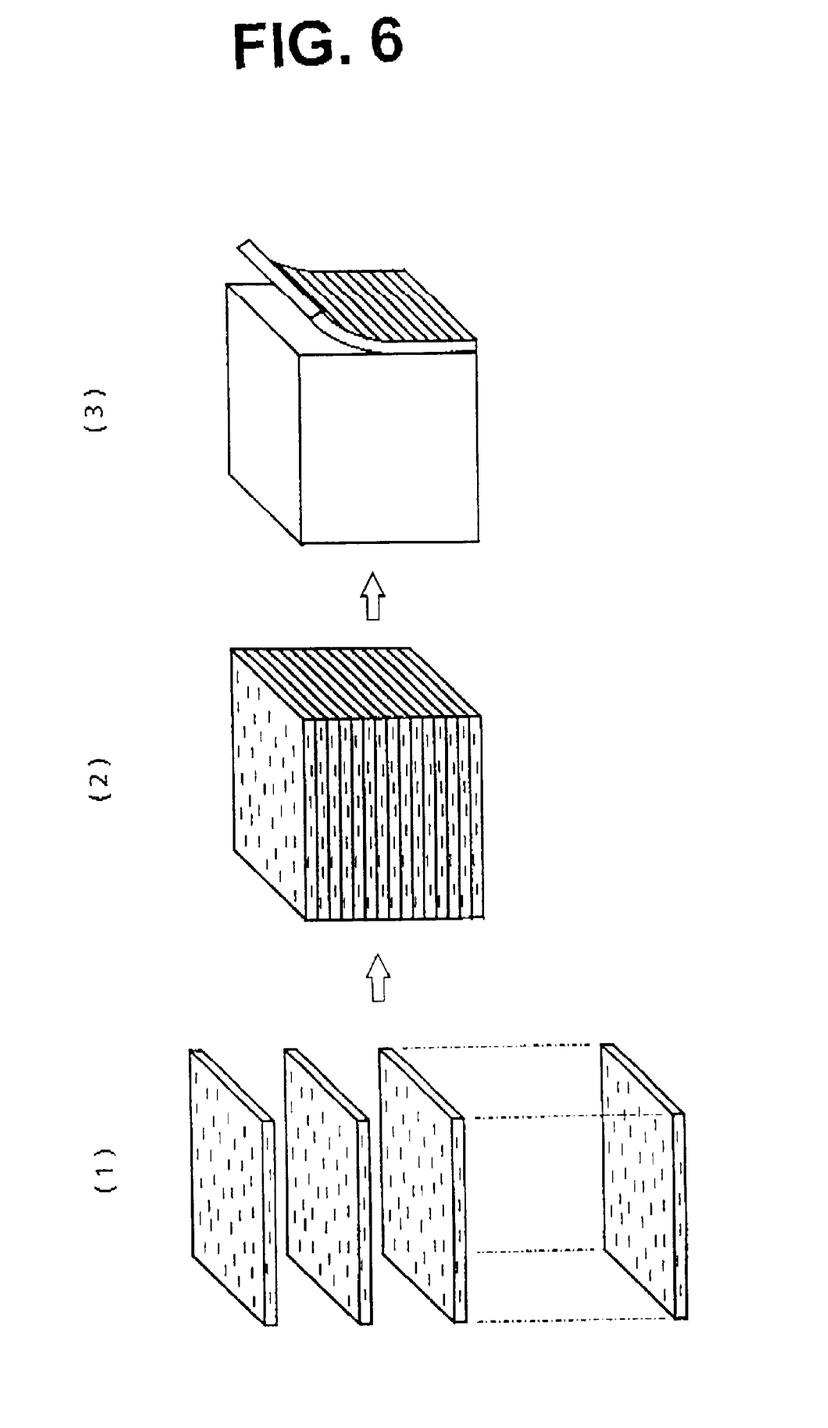
FIG. 6 shows a series of steps for the preparing a stimulable phosphor film of the invention, in which (1) indicates lamination of phosphor films in which the acicular phosphor particles are arranged to show the alignment in the same direction, (2) indicates a block of the phosphor films, and (3) indicates a slicing step of the block.

The continuous film in which the acicular phosphor particles are aligned in the longitudinal direction is then processed to give a stimulable phosphor film of the invention, in the manner illustrated in FIGS. 6-(1), -(2), and -(3).

The continuous film is sectioned in the width direction to prepare a multiple of rectangular films. The rectangular films are then laminated in the manner shown in FIG. 6-(1), in which the acicular phosphor particles in the films are aligned in the same direction. The laminate is then heated under pressure to give a laminate block, as is shown in FIG. 6-(2). The laminate block is then sliced along the face perpendicular to the longer axes of the aligned acicular phosphor particles, in the manner illustrated in FIG. 6-(3). Thus, a stimulable phosphor film of the invention in which acicular particles of stimulable phosphor having an aspect ratio of 1.5 or more are oriented in the direction of depth of the phosphor film is prepared.

If the rectangular acicular phosphor-oriented film and a light-reflecting film such as a resin film containing light-reflecting material are alternately laminated in the step of FIG. 6-(2), stimulable phosphor films having a structure in which the acicular phosphor particles are enclosed with light-reflecting partitions containing light-reflecting material are produced in the step of FIG. 6-(3).

Examples of the light-reflecting (or low light-absorbing) materials are fine particles of white inorganic materials such as aluminum oxide (i.e., alumina), titanium dioxide, yttrium oxide, zirconium oxide, gadolinium oxide, tellurium oxide, ruthenium oxide, and lead oxide. Certain stimulable phosphor particles may be employed as the light-reflecting particles. Preferred are alumina particles and yttrium oxide.

The light-reflecting particles preferably have a mean particle diameter of 0.01 to 5.0 μm. The light-reflecting particles are preferably dispersed in a polymer binder. The polymer binder preferably is polyurethane, polyacrylate, polyethylene, polystyrene, or a fluororesin.

The stimulable phosphor sheet of the invention may have a transparent film serving as a support and a transparent cover film serving as a protective film, so as to keep the stimulable phosphor film from deterioration and to facilitate handling of the phosphor sheet. The phosphor film also can have a light-reflective layer on one surface side (or between the phosphor film and the support, if the support is provided), so as to increase the sensitivity of the phosphor film.

As the support, a sheet or a film of flexible resin material having a thickness of 50 μm to 1 mm is generally employed.

The support may be transparent or may contain light-reflecting material (eg., alumina particles, titanium dioxide particles, and barium sulfate particles) or voids, for reflecting the stimulating rays or the stimulated emission. Further, it may contain light-absorbing material (e.g., carbon black) for absorbing the stimulating rays or the stimulated emission. On the phosphor film-side surface of the support, auxiliary layers (e.g., light-reflecting layer, light-absorbing layer, adhesive layer, electroconductive layer) or many hollows may be provided. On the other side surface, a friction-reducing layer or an anti-scratch layer may be formed.

On the surface not facing the support, the stimulable phosphor film may have a protective cover film. In order not to affect the simulating rays or the stimulated emission, the cover film preferably is transparent. Further, for efficiently protecting the stimulable phosphor sheet from chemical deterioration and physical damage, the protective film should be both chemically stable and physically strong.

The cover film can be provided by fixing a beforehand prepared transparent plastic film (e.g., polyethylene terephthalate) on the stimulable phosphor sheet with adhesive, or by coating the phosphor sheet with a solution of cover film material and drying the coated solution. Into the cover film, fillers of fine particles may be incorporated so as to reduce blotches caused by interference and to improve the quality of the resultant radiation image. The thickness of the cover film generally is in the range of approx. 0.1 to 20 $\mu$m.

For enhancing the resistance to staining, a fluororesin layer is preferably provided on the cover film. The fluororesin layer can be formed by coating the surface of the cover film with a solution of a fluororesin in an organic solvent, and drying the coated solution. The fluororesin may be used singly, but generally a mixture of the fluororesin and a film-forming resin is employed. In the mixture, an oligomer having polysiloxane structure or perfluoroalkyl group can be further added. Into the fluororesin layer, a filler of fine particles may be incorporated so as to reduce blotches caused by interference and to improve quality of the resulting radiation image. The thickness of fluororesin layer generally is in the range of 0.5 to 20 $\mu$m. In the formation of the fluororesin layer, additives such as a crosslinking agent, a film-hardening agent and an anti-yellowing agent can be used. In particular, the crosslinking agent advantageously improves durability of the fluororesin layer.

The light-reflective layer can comprise a white pigment such as alumina pigment, titanium dioxide pigment, or a barium sulfate pigment, or phosphor particles giving no stimulated emission. In the light-reflective layer, the pigment or particles are dispersed and supported in a binder.

The present invention is further described by the following examples.

EXAMPLE 1

1) 1,000 g of particles of acicular stimulable phosphor (BaFBr:Eu, mean aspect ratio: approximately 3.0, median of the particle sizes: 5 $\mu$m) and 250 g of 50% methyl ethyl solution of a thermoplastic high molecular weight-polyester resin (Byron 300, available Toyobo Co., Ltd.) were mixed with methyl ethyl ketone. The mixture was dispersed using a propeller to give a dispersion having a viscosity of 100 PS. The dispersion was supplied into a stock tank 21 of FIG. 2, and extruded from a nozzle 23 (inner diameter: 2 nm) at 10 kg/cm$^2$ by a pressure supplied by a plunger pump 22. The extruded dispersion is run at a linear rate of 3 m/sec., passing rollers 24a, 24b, 24c, during which the dispersion film was continuously dried in air dispersion was organic solvent in weight ratio of 5:1. The dried continuous film was then wound around a winding roll 25. The obtained continuous film had a thickness of 250 $\mu$m. Electron microscopic observation of the continuous film indicated that the acicular phosphor particles were aligned in the longitudinal direction of the continuous film.

EXAMPLE 2

The phosphor dispersion of Example 1 was extruded from a stainless vessel 26 through a slit 27 (length: 300 mm), in the manner as shown in FIG. 3, at a pressure of 20 kg/cm$^2$ onto a belt having a releasing surface. The dispersion film placed on the belt was dried to give a continuous film having a thickness of 250 $\mu$m. Electron microscopic observation of the film indicated that the acicular phosphor particles were aligned in the longitudinal direction of the continuous film.

EXAMPLE 3

The phosphor dispersion of Example 1 is diluted with methyl ethyl ketone to give a dispersion having a viscosity of 20 PS. Thus diluted dispersion was spread on a belt (thickness: 250 $\mu$m) having a releasing surface. The spread dispersion film was dried at 100° C. for 10 min., to prepare a continuous film of 500 $\mu$m thick. The continuous film was rolled in the manner shown in FIG. 4 using a pair of rollers (diameter: 200 mm) 31a, 31b. The lower driving roller 31a was rotated at a linear rate of 0.5 m/min., while the upper counter roller 31b rotated at a linear rate of 0.25 m/min., under pressure of a brake 32. Both rollers were heated to 120° C. The continuous film was thus rolled at a pressure of 1 kg/cm (per unit length of the width length of the film) to give a rolled and extended continuous film of 250 $\mu$m thick. Electron microscopic observation of the film indicated that the acicular phosphor particles were aligned in the longitudinal direction of the continuous film.

EXAMPLE 4

The continuous 500 $\mu$m thick film of Example 3 was introduced into the first zone (maintained at 120° C.) 41 of FIG. 5, and passed through a couple of pass rollers 42, 43. The pass rollers 43 were rotated faster than the pass rollers 42, so as to apply a tension of 2 kg/cm to the running continuous film. The continuous film was then passed through the second zone 44 and wound around a winding roll 47, to give a continuous film of 250 $\mu$m thick. Electron microscopic observation of the film indicated that the acicular phosphor particles were aligned in the longitudinal direction of the continuous film.

EXAMPLE 5

1,000 phosphor-aligned films of example 2 were piled up in the manner as illustrated in FIGS. 6-(1) and -(2) to form a laminate having a thickness of 25 cm. The laminate was then heated under pressure (pressure: 100 kg/cm$^2$, temperature: 120 ° C.) for 10 minutes using a hot press to produce a laminate block. The laminate block was cooled and sliced in the manner illustrated in FIG. 6-(3) using a wide microtome, to produce plural stimulable phosphor film (thickness: 500 $\mu$m).

Figure 1:
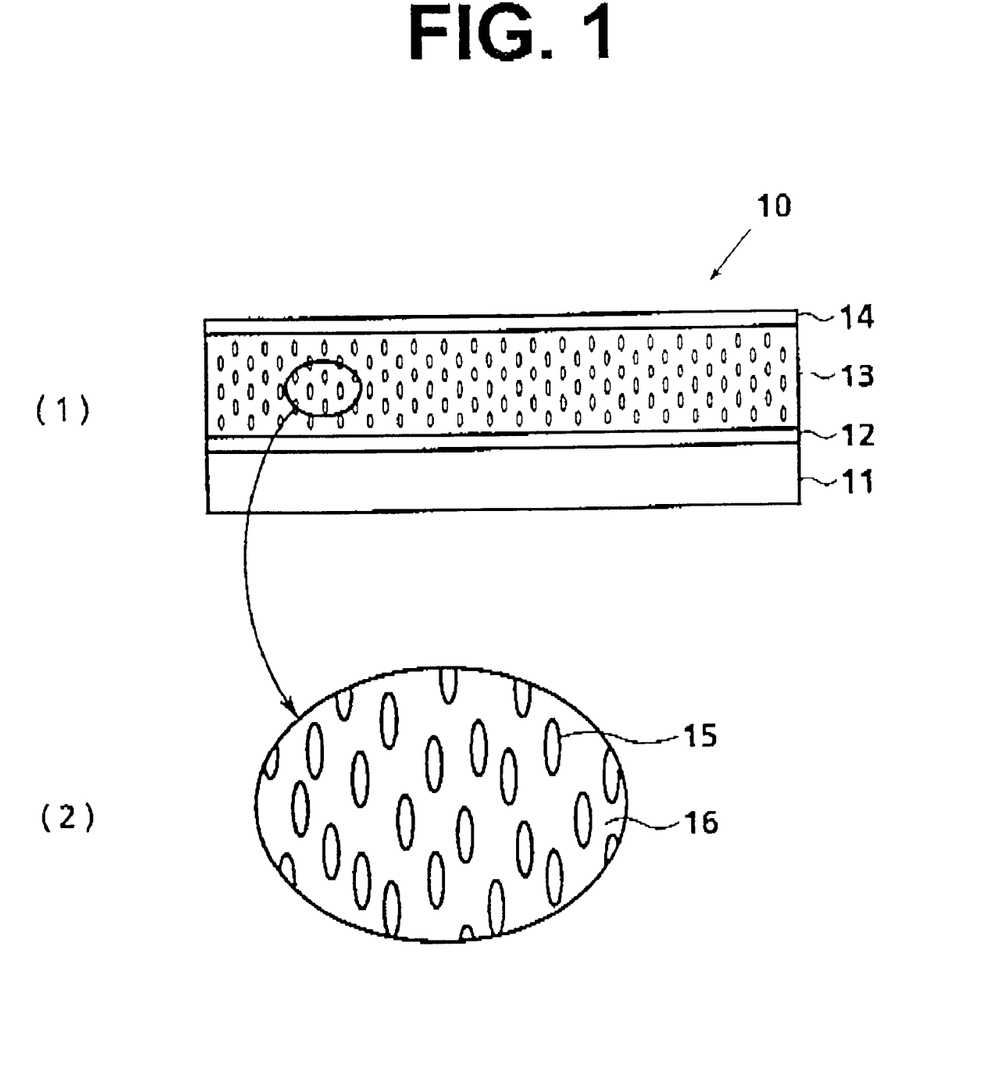

The stimulable phosphor film was placed on a polyethylene terephthalate film (support: 250 $\mu$m thick) having an adhesive subbing layer (thickness: 30 $\mu$m) and pressed at 90° C., to fix the stimulable phosphor film to the support. On the stimulable phosphor film was then placed a transparent polyethylene terephthalate film (protective film: 7 $\mu$m thick) having an adhesive subbing layer (thickness: 1.5 $\mu$m) and pressed, to fix the protective film onto the stimulable phosphor film. Thus, there was produced a stimulable phosphor sheet of the invention having a support, an adhesive layer, a stimulable phosphor layer, and a protective layer, in order, in the form of FIG. 1.

EXAMPLE 6

The procedures of Example 5 were repeated except for using the phosphor-aligned film of Example 3, to give a stimulable phosphor film containing oriented acicular phosphor particles. The stimulable phosphor film was then placed between the support and the protective film, to give a stimulable phosphor sheet of the invention.

EXAMPLE 7

The procedures of Example 5 were repeated except for using the phosphor-aligned film of Example 4, to give a stimulable phosphor film containing oriented acicular phosphor particles. The stimulable phosphor film was then placed between the support and the protective film, to give a stimulable phosphor sheet of the invention.

EXAMPLE 8

The phosphor-aligned film of Example 2 was rolled in the same manner as in Example 3, to give a continuous film having enhanced acicular particle alignment. Thus prepared continuous film was used to give a stimulable phosphor film containing oriented acicular phosphor particles, in the same manner as in FIG. 5. The stimulable phosphor film was then placed between the support and the protective film, to give a stimulable phosphor sheet of the invention.

EXAMPLE 9

The phosphor-aligned film of Example 2 was rolled in the same manner as in Example 3, to give a continuous film (thickness: 100 $\mu$m) having enhanced acicular particle alignment.

Separately, particles of acicular stimulable phosphor (BaFBr:Eu, mean aspect ratio: approximately 3.0, median of the particle sizes: 5 $\mu$m), alumina fine particles (median of the particle sizes: 1 $\mu$m), and a thermoplastic high-molecular weight polyester resin in a weight ratio of 40:30:3 were dispersed in an organic solvent to prepare a phosphor dispersion.

The dispersion was spread on a belt having a releasing surface, dried, and peeled off to give a partition film (thickness: 8 $\mu$m thick) containing alumina particles and stimulable phosphor particles.

The phosphor aligned films and the partition films were alternately piled up under the condition that the acicular phosphor particles were placed to show the same directions, to give a laminate block having total 5,000 films. The laminate block was then sliced in the same manner as in FIG. 5, to prepare a partitioned stimulable phosphor film in which the acicular phosphor particles are highly oriented. The stimulable phosphor film was then placed between the support and the protective film, to give a stimulable phosphor sheet of the invention.

Comparison Example 1

1,000 g of particles of tetradecahedral stimulable phosphor (BaFBr:Eu, mean aspect ratio: approximately 1.0, median of the particle sizes: 5 $\mu$m) and 250 g of 50% methyl ethyl solution of a thermoplastic high molecular weight polyester resin (Byron 300, available Toyobo Co., Ltd.) were mixed with methyl ethyl ketone. The mixture was dispersed using a propeller to give a dispersion having a viscosity of 25 PS. The dispersion was spread on a belt (having a releasing surface) using a doctor blade and dried at 100° C. for 15 minutes, to prepare a stimulable phosphor film of 500 $\mu$m thick.

The stimulable phosphor film was then placed between the support and the protective film in the same manner as in Example 5, to give a stimulable phosphor sheet for comparison.

Comparison Example 2

A stimulable phosphor-aligned film of 500 $\mu$m thick was prepared in the same manner as in Example 3 except for using a were repeated except for using an acicular stimulable phosphor (BaFBr:Eu, mean aspect ratio: approximately 5.0, median of the particle sizes: 5 $\mu$m).

The stimulable phosphor-aligned film was placed between the support and the protective film in the same manner as in Example 5, to give a stimulable phosphor sheet for comparison.

Evaluation of Stimulable Phosphor Sheet

The stimulable phosphor sheets obtained in Examples 5 to 9 and Comparison Examples 1 and 2 were exposed to irradiation of X-rays (tube voltage: 80 kVp, 80 mA, radiation dose: 10 mR) through a CTF chart. Subsequently, a He-Ne laser beam was scanned on the irradiated stimulable phosphor sheet, and the stimulated emission was collected to obtain radiation image data. The radiation image data were then processed to reproduce a radiation image on a radiographic film. the reproduced radiation image was then subjected to determination of image sharpness.

Separately, the stimulable phosphor sheet was exposed to irradiation of X-rays (tube voltage; 80 kVp, 80 mA, radiation dose: 1 mR) using no CTF chart. Then, the same procedure was repeated to reproduce a radiation image on a radiographic film. The reproduced radiation image was then subjected to detection of image graininess.

Figure 7:
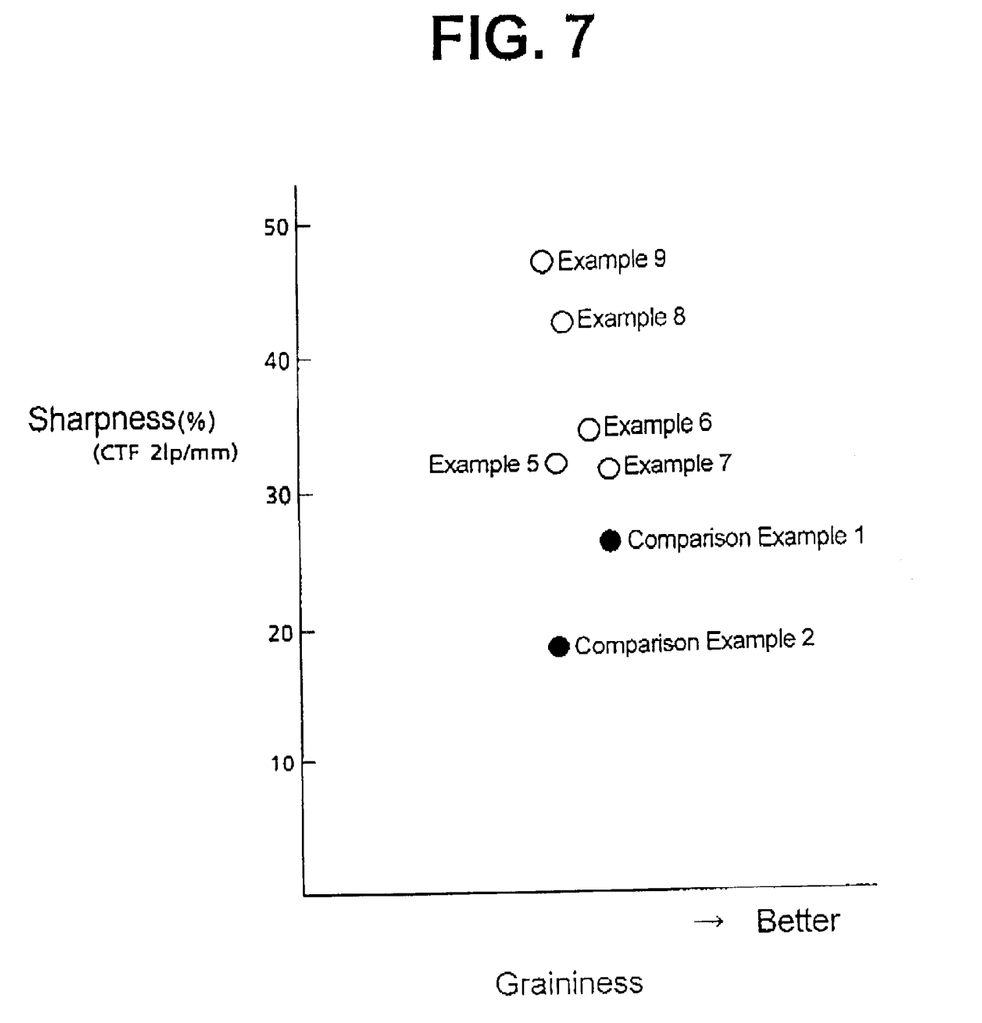
FIG. 7 is a graph in which the relationships between the graininess and sharpness of the stimulable phosphor sheets prepared in the working examples.

The results are illustrated in a graph of FIG. 7, in which a relationship between sharpness and graininess of the radiation image reproduced using each stimulable phosphor sheet. The blank circle means the relationship observed in the use of the stimulable phosphor sheet of the invention. The black circle means the relationship observed in the use of the stimulable phosphor sheet for comparison.

The graph of FIG. 7 indicates that the stimulable phosphor sheets of the invention give a high sharpness at the same graininess level than a stimulable phosphor sheet of Comparison Example 1 (using a stimulable phosphor particles having a low aspect ratio) and a stimulable phosphor sheet of Comparison Example 2 (in which the acicular phosphor particles are aligned on the sheet).

In the stimulable phosphor sheets of the invention, the stimulable phosphor sheet of Example 8 having the increased acicular particle orientation gives higher sharpness.

Further, it was noted that the stimulable phosphor sheet of Example 9 having one-dimensionally aligned partitions gives the highest sharpness.

What is claimed is:

1. A stimulable phosphor sheet comprising a stimulable phosphor film in which acicular particles of stimulable phosphor having an aspect ratio of 1.5 or more are oriented in the direction of depth of the phosphor film.

2. The stimulable phosphor sheet of claim 1, wherein the acicular particles have a median of particle size in the range of 1 to 20 μm.

3. The stimulable phosphor sheet of claim 1, wherein the aspect ratio of the acicular particles is in the range of 2.0 to 10.0.

4. The stimulable phosphor sheet of claim 1, wherein the stimulable phosphor film has a structure in which the acicular phosphor particles are enclosed with partitions containing light-reflecting material and stimulable phosphor particles.

5. The stimulable phosphor sheet of claim 1, wherein the stimulable phosphor film comprises the acicular particles of stimulable phosphor and a binder.

6. The stimulable phosphor sheet of claim 1, wherein the stimulable phosphor comprises a rare earth element-activated alkaline earth metal fluorohalide.

7. The stimulable phosphor sheet of claim 1, which further comprises two transparent films between which the stimulable phosphor film is placed.

8. The stimulable phosphor sheet of claim 1, which further comprises one transparent film and one non-transparent film between which the stimulable phosphor film is placed.

9. A radiation image recording and reproducing method comprising the steps of recording a radiation image as a latent image on a stimulable phosphor sheet, irradiating the phosphor sheet with stimulating rays to release stimulated emission from the latent image, collecting the stimulated emission, and electrically processing the collected emission to reproduce the radiation image, the stimulable phosphor sheet comprising a stimulable phosphor film in which acicular particles of stimulable phosphor having an aspect ratio of 1.5 or more are oriented in the direction of depth of the phosphor film.

10. A process for preparing a stimulable phosphor film in which acicular particles of stimulable phosphor having an aspect ratio of 1.5 or more are oriented in the direction of depth of the film, comprising the steps of:

continuously causing a dispersion comprising the acicular particles of stimulable phosphor and a liquid medium to flow in one direction to produce a continuous film comprising a liquid medium in which the acicular phosphor particles are aligned in the direction;

drying the film of liquid film to produce a dry continuous film in which the acicular phosphor particles are aligned in the direction;

sectioning the dry continuous film to give a multiple of phosphor films;

laminating the phosphor films one on another under the condition that all phosphor films have the same alignment of the acicular phosphor particles to produce a phosphor film block in which the acicular phosphor particles are aligned in the same direction; and slicing the phosphor film block in the direction perpendicular to the direction of alignment of the acicular phosphor particles.

11. The process of claim 10, wherein the liquid medium comprises an organic solvent and a polymer dissolved in the organic solvent.

12. The process of claim 10, wherein the dry continuous film is rolled to give a dry continuous film having a reduced thickness.

13. The process of claim 10, wherein the dry continuous film is extended in the direction of length of the continuous film to give a dry continuous film having a reduced thickness.

14. A process for preparing a stimulable phosphor film having a structure in which the acicular particles of stimulable phosphor having an aspect ratio of 1.5 or more are oriented in the direction of depth of the film and enclosed with partitions containing light-reflecting material and stimulable phosphor particles, comprising the steps of:

continuously causing a dispersion comprising the acicular particles of stimulable phosphor and a liquid medium to flow in one direction to produce a continuous film comprising a liquid medium in which the acicular phosphor particles are aligned in the direction;

drying the film of liquid film to produce a dry continuous film in which the acicular phosphor particles are aligned in the direction;

sectioning the dry continuous film to give a multiple of phosphor films;

preparing partition films containing light-reflecting material and stimulable phosphor particles;

laminating the phosphor films and the partition films one on another under the condition that all phosphor films have the same alignment of the acicular phosphor particles to produce a block in which the phosphor films and the partition films are alternatively laminated; and slicing the block in the direction perpendicular to the direction of alignment of the acicular phosphor particles.

15. The process of claim 14, wherein the liquid medium comprises an organic solvent and a polymer dissolved in the organic solvent.

16. The process of claim 14, wherein the dry continuous film is rolled to give a dry continuous film having a reduced thickness.

17. The process of claim 14, wherein the dry continuous film is extended in the direction of length of the continuous film to give a dry continuous film having a reduced thickness.

* * * * *